United States Patent
Tazawa et al.

(10) Patent No.: US 10,007,249 B2
(45) Date of Patent: Jun. 26, 2018

(54) CONTROL APPARATUS OF AN ELECTRIC MOTOR

(71) Applicant: Panasonic Intellectual Property Management Co., Ltd., Osaka (JP)

(72) Inventors: Toru Tazawa, Osaka (JP); Hiroshi Fujiwara, Osaka (JP); Masaru Nishizono, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days. days.

(21) Appl. No.: 15/103,986

(22) PCT Filed: Feb. 18, 2015

(86) PCT No.: PCT/JP2015/000752
§ 371 (c)(1),
(2) Date: Jun. 13, 2016

(87) PCT Pub. No.: WO2015/129207
PCT Pub. Date: Sep. 3, 2015

(65) Prior Publication Data
US 2016/0313721 A1 Oct. 27, 2016

(30) Foreign Application Priority Data

Feb. 25, 2014 (JP) .................................. 2014-033743

(51) Int. Cl.
*G05B 11/36* (2006.01)
*G05B 19/35* (2006.01)
(Continued)

(52) U.S. Cl.
CPC ........... *G05B 19/358* (2013.01); *G05B 19/19* (2013.01); *H02P 23/0004* (2013.01);
(Continued)

(58) Field of Classification Search
CPC .... G05B 19/19; G05B 19/404; G05B 19/258; G05B 11/42; G05B 5/01; G05B 11/012;
(Continued)

(56) References Cited

U.S. PATENT DOCUMENTS

| 5,304,905 A | 4/1994 | Iwasaki |
| 6,566,837 B1 * | 5/2003 | Zhang .................... G05B 19/19 318/610 |

(Continued)

FOREIGN PATENT DOCUMENTS

| JP | 4-325886 | 11/1992 |
| JP | 6-208404 | 7/1994 |

(Continued)

OTHER PUBLICATIONS

International Search Report of PCT application No. PCT/JP2015/000752 dated Apr. 21, 2015.

*Primary Examiner* — Rina Duda

(74) *Attorney, Agent, or Firm* — McDermott Will & Emery LLP

(57) ABSTRACT

A method, according to the present invention, of adjusting control parameters used in a control apparatus of an electric motor includes the steps of: computing a first frequency characteristic (Step 1); computing a present speed-proportional gain range (Step 2); computing a present mechanical-system characteristic constant (Step 3); computing a present proportional gain range (Step 4); computing a secular characteristic (Step 5); computing a secular speed-proportional gain range (Step 6); computing a secular proportional gain range (Step 7); and selecting proportional gain values (Step 8).

3 Claims, 9 Drawing Sheets

(51) Int. Cl.
*H02P 23/00* (2016.01)
*G05B 19/19* (2006.01)

(52) U.S. Cl.
CPC ............. *G05B 2219/34432* (2013.01); *G05B 2219/37312* (2013.01); *G05B 2219/42152* (2013.01); *H02P 2205/05* (2013.01); *H02P 2205/07* (2013.01)

(58) Field of Classification Search
CPC ...... G05B 11/013; H02P 23/0045; H02P 6/10; H02P 21/141; H02P 21/146
USPC ................ 318/609, 610, 727, 461, 432, 434
See application file for complete search history.

(56) References Cited

U.S. PATENT DOCUMENTS

| | | | |
|---|---|---|---|
| 7,049,775 B2* | 5/2006 | Iwashita | B30B 15/0094 318/566 |
| 7,224,141 B2* | 5/2007 | Ide | G05B 19/19 318/560 |
| 7,567,047 B2* | 7/2009 | Rozman | H02P 6/10 180/412 |
| 2002/0019715 A1 | 2/2002 | Cohen et al. | |
| 2002/0022903 A1 | 2/2002 | Krah et al. | |
| 2009/0102409 A1* | 4/2009 | Okita | G05B 19/404 318/561 |
| 2010/0231158 A1* | 9/2010 | Jonsson | G05B 19/258 318/609 |
| 2011/0074330 A1 | 3/2011 | Ellis et al. | |
| 2012/0194121 A1* | 8/2012 | Miyaji | G05B 19/404 318/615 |

FOREIGN PATENT DOCUMENTS

| | | |
|---|---|---|
| JP | 2002-116802 | 4/2002 |
| JP | 2005-245051 | 9/2005 |
| NO | 2011/040998 | 4/2011 |

* cited by examiner

CONTROL APPARATUS OF AN ELECTRIC MOTOR

TECHNICAL FIELD

The present invention relates to methods for adjusting control parameters used in control apparatuses of electric motors. Moreover, the present invention also relates to control apparatuses of electric motors in which the methods for adjusting the control parameters described above are used.

BACKGROUND ART

Conventionally, methods for adjusting control parameters have been known for use in control apparatuses of electric motors. Such methods include the technology disclosed in Patent Literature 1, for example. The control apparatus disclosed in Patent Literature 1 calculates optimal control parameters on the basis of gain characteristics and phase characteristics, by using frequency characteristics of a drive system.

FIG. 9 is a view of a configuration of a control apparatus of a conventional electric motor. Control apparatus 151 shown in FIG. 9 is one example of conventional technologies. Usually, when electric motor 101 is driven, control apparatus 151 of the motor shown in FIG. 9 operates such that switch 109 is connected to an a-side terminal. At this moment, parts involved in the apparatus perform the following operations.

That is, mechanical system 104 includes motor 101, load 102, and motor position detector 103. Load 102 is driven by motor 101. Detection position $\theta_m$ of motor 101 is output from motor position detector 103. Speed computing unit 106 computes detection speed $v_m$ of the motor, from the amount of variation per unit time in detection position $\theta_m$. Speed computing unit 106 outputs thus-computed detection speed $v_m$ of the motor. Position controller 107 outputs speed command $v_r$ such that detection position $\theta_m$ follows position command $\theta_r$. Position command $\theta_r$ is inputted from the outside of control apparatus 151 of the motor. Speed controller 108 outputs torque command $\tau_r$ such that detection speed $v_m$ of the motor follows speed command $v_r$. Thus-output torque command $\tau_r$ turns to new torque command $\tau_{r2}$, via filter 110. New torque command $\tau_{r2}$ is inputted to torque controller 111. Motor 101 is controlled by the output from torque controller 111.

When the control parameters are adjusted, control apparatus 151 of the motor shown in FIG. 9 operates such that switch 109 is connected to a b-side terminal. At this moment, parts involved in the apparatus perform the following operations.

That is, torque command generator 112 for measuring frequency characteristics outputs first torque command $\tau_{r1}$. First torque command $\tau_{r1}$ contains a plurality of frequency components, such as a maximum length sequence (M-sequence) signal, for example. The M-sequence signal is a random binary bit-string signal indicated as either 0/1 or −1/1. Motor 101 is driven in accordance with first torque command $\tau_{r1}$. At this moment, first torque command $\tau_{r1}$ and detection speed $v_m$ of the motor are inputted to control parameter adjuster 115.

Control parameter adjuster 115 computes frequency characteristics from first torque command $\tau_{r1}$ to motor speed $v_m$. Control parameter adjuster 115 computes a control parameter of speed controller 108, a control parameter of position controller 107, and a control parameter of filter 110, by using the computed frequency characteristics, such that the operations of the control system of the motor is stabilized and the responsivity of the control system of the motor is enhanced. The control system of the motor includes speed controller 108, position controller 107, and filter 110.

CITATION LIST

Patent Literature

PTL 1: Japanese Patent Unexamined Publication No. 2005-245051

SUMMARY OF THE INVENTION

A control apparatus, to which the present invention is applied, of an electric motor includes a first position controller, a speed controller, a torque controller, and a torque command generator.

The first position controller generates a speed command such that a position command transmitted from the outside of the control apparatus of the motor coincides with a load's detection position, i.e. a detected position of a load coupled with the motor.

The speed controller generates a torque command such that the speed command coincides with a motor's detection speed, i.e. a detected speed of the motor.

The torque controller drives the motor in accordance with the torque command.

The torque command generator outputs a for-adjustment torque command which includes a plurality of frequency components.

In the motor's control apparatus to which the present invention is applied, a speed feedback circuit and a first position feedback circuit are formed.

The speed feedback circuit includes the speed controller and the torque controller. The speed feedback circuit is a control loop in which a motor's detection speed to be re-input to the speed controller is acquired from both the speed command and the motor's detection speed which both have been inputted to the speed controller.

The first position feedback circuit includes the first position controller and the speed feedback circuit. The first position feedback circuit is a control loop in which a load's detection position, i.e. a detected position of the load coupled with the motor, to be re-inputted to the first position controller is acquired. This acquisition is made from both the detection position of the load coupled with the motor and the position command which both have been inputted to the first position controller.

A method, according to the present invention, of adjusting control parameters used in the control apparatus of the motor described above includes the steps of: computing a first frequency characteristic, computing a present speed-proportional gain range, computing a present mechanical-system characteristic constant, computing a present proportional gain range, computing a secular characteristic, computing a secular speed-proportional gain range, computing a secular proportional gain range, and selecting proportional gains.

The step of computing the first frequency characteristic uses the for-adjustment torque command and the motor's detection speed. The for-adjustment torque command is output from the torque command generator. The motor's detection speed is detected when the motor is driven in accordance with the for-adjustment torque command. The step of computing the first frequency characteristic computes a present load-frequency characteristic which is frequency characteristics from the for-adjustment torque command to the motor's detection speed.

The step of computing the present speed-proportional gain range uses a speed-proportional gain and the present load-frequency characteristic. The speed-proportional gain is the control parameter used in the speed controller. The step of computing the present speed-proportional gain range computes a range of a present speed-proportional gain of the speed-proportional gain such that the speed feedback circuit becomes stable.

The step of computing the present mechanical-system characteristic constant uses the present load-frequency characteristic. The step of computing the present mechanical-system characteristic constant computes the present mechanical-system characteristic constant which indicates characteristics of a mechanical system containing the motor and the load.

The step of computing the present proportional gain range uses the speed-proportional gain, a position-proportional gain which is the control parameter used in the first position controller, the present load-frequency characteristic, and the present mechanical-system characteristic constant. The step of computing the present proportional gain range computes the present proportional gain range, which is a range of combination of the present speed-proportional gain and a present position-proportional gain of the position-proportional gain, such that the position feedback circuit becomes stable.

The step of computing the secular characteristic computes a secular load-frequency characteristic and a secular mechanical-system characteristic constant, on the basis of the present load-frequency characteristic and secular-change information transmitted from the outside of the control apparatus of the motor. The secular load-frequency characteristic is a load frequency characteristic which has undergone a secular change. The secular mechanical-system characteristic constant is a mechanical-system characteristic constant which has undergone the secular change.

The step of computing the secular speed-proportional gain range uses the speed-proportional gain and the secular load-frequency characteristic. The step of computing the secular speed-proportional gain range computes the secular speed-proportional gain range, which is a range of the speed-proportional gain that has undergone the secular change, such that the speed feedback circuit becomes stable.

The step of computing the secular proportional gain range uses the speed-proportional gain, the position-proportional gain, the secular load-frequency characteristic, and the secular mechanical-system characteristic constant. The step of computing the secular proportional gain range computes the secular proportional gain range, which is a range of combination of a secular speed-proportional gain and a secular position-proportional gain, such that the first position feedback circuit becomes stable.

The step of selecting the proportional gains selects proportional gains from computed-ranges. The proportional gains include a value of the speed-proportional gain and a value of the position-proportional gain. The computed-ranges including: the present speed-proportional gain range, the range of combination of the present speed-proportional gain and the present position-proportional gain, the secular speed-proportional gain range, and the range of combination of the secular speed-proportional gain and the secular position-proportional gain. This selection is performed such that each value of the selected proportional gains satisfies all of the corresponding computed-ranges.

The present speed-proportional gain range is computed in the step of computing the present speed-proportional gain range. The range of combination of the present speed-proportional gain and the present position-proportional gain is computed in the step of computing the present proportional gain range. The secular speed-proportional gain range is computed in the step of computing the secular speed-proportional gain range. The range of combination of the secular speed-proportional gain and the secular position-proportional gain is computed in the step of computing the secular proportional gain range.

In accordance with the present invention, the position of an end of the load coupled with the motor is directly detected, thereby computing the position command by using the control apparatus in accordance with the result of the detection. An object of the present invention is to provide the method of adjusting the control parameters used in the control apparatus of the motor such that the motor is controlled to follow the computed position command.

DESCRIPTION OF EMBODIMENTS

Figure 1:
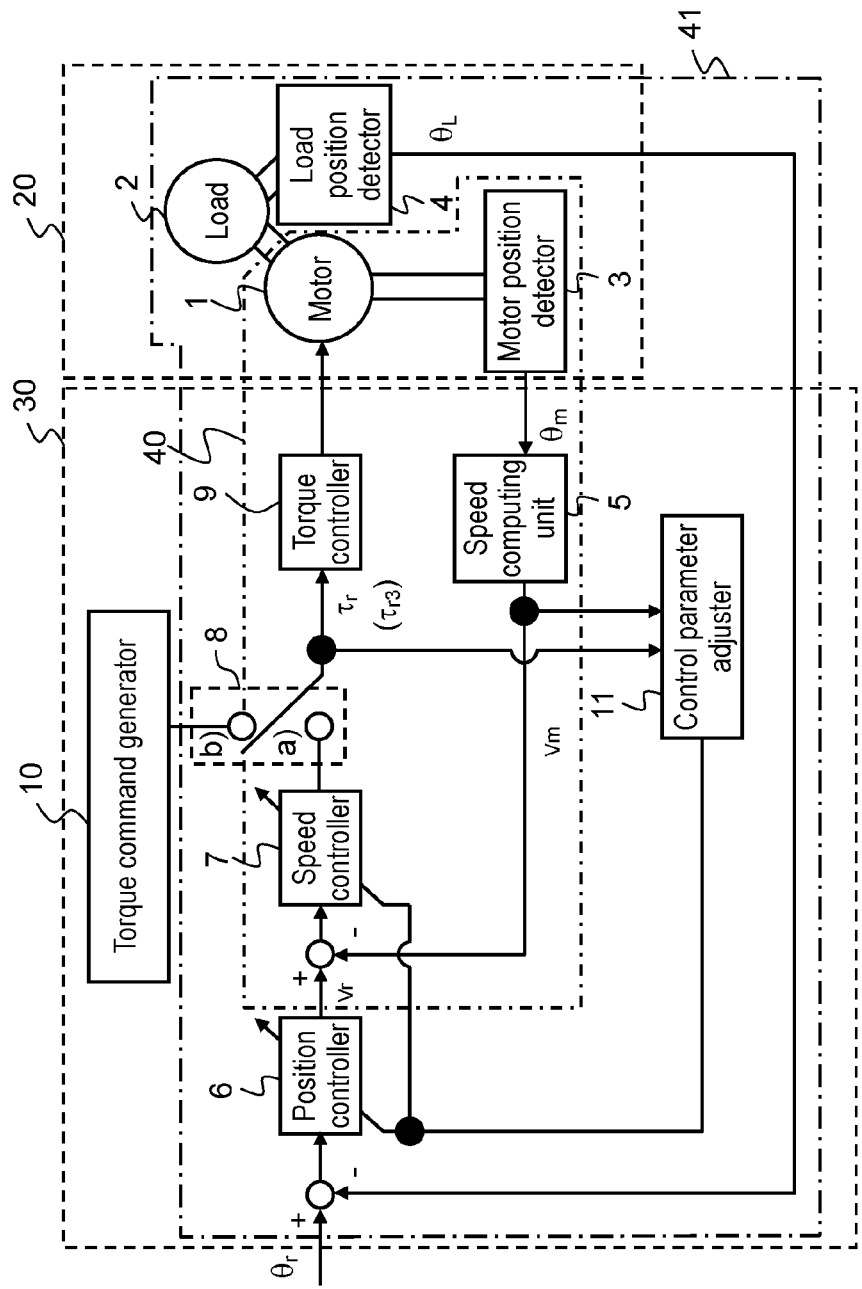
FIG. 1 is a view of a configuration of a control apparatus of a motor according to a first embodiment of the present invention.

A method of adjusting control parameters used in a control apparatus of a motor, according to an embodiment of the present invention, is capable of calculating the control parameters, by using frequency characteristics, in the steps of calculation to be described later. Such computed control parameters make it possible to achieve stability of fully-closed control performed by the control apparatus and high responsivity of the control apparatus. To calculate the control parameters, the following two frequency characteristics are used. One is frequency characteristics from a torque command to a motor speed, which are obtained by using data from measurement operations. The other is frequency characteristics which are obtained by modifying the frequency characteristics described above from a secular-change point of view.

Consequently, in the control apparatus of the motor in which the fully-closed control is adopted, the control parameters can be adjusted to achieve stable drive of the motor even if such a secular change occurs.

Like this, the control apparatus, having a configuration to be described later, of the motor according to the embodiment of the present invention is capable of computing the control parameters by using frequency characteristics. Such computed control parameters make it possible to achieve the stability of the fully-closed control performed by the control apparatus and the high responsivity of the control apparatus. To calculate the control parameters, the following two frequency characteristics are used. One is frequency characteristics from a torque command to a motor speed, which are obtained by using data from measurement operations. The other is frequency characteristics which are obtained by modifying the frequency characteristics described above from a secular-change point of view.

Consequently, in the control apparatus of the motor in which the fully-closed control is adopted, the control parameters can be adjusted to achieve the stable drive of the motor even if controlled objects undergo any secular change in their characteristics. Such controlled objects include the motor and loads connected to the motor.

That is to say, there have been the following problems to be solved regarding the methods of adjusting the control parameters for use in control apparatuses of conventional electric motors, and regarding control apparatuses of the conventional motors which adopt the methods of adjusting the control parameters.

That is, the control apparatus of the conventional motor has adopted so-called semi-closed control of the motor. The semi-closed control includes detecting the operation position of a movable element set in the motor, and controlling the motor on the basis of the detected operation position of the movable element set in the motor. That is, the control apparatus of the conventional motor has a configuration for adjusting the control parameters to perform the semi-closed control. Therefore, such a configuration cannot be applied to the control apparatus that performs so-called fully-closed control in which the position on the load side is controlled, with the load being connected to the motor.

Moreover, when adjusting the control parameters, the control apparatus of the conventional motor uses the frequency characteristics of a drive system. The conventional method of adjusting the control parameters uses a result of measurement of the motor at the point in time when the frequency characteristics are computed. In other words, if the control apparatus of the motor has undergone the secular change, the conventional method of adjusting the control parameters is difficult to adjust the control parameters which can achieve stability of the control. That is, the control apparatus of the conventional motor possibly causes unstable control in the state where the control apparatus of the motor has undergone the secular change. In this case, the control apparatus of the conventional motor needs to be re-adjusted.

In contrast to this, the method of adjusting the control parameters used in the control apparatus of the motor according to the embodiment of the present invention, is applicable to the control apparatus which adopts the fully-closed control.

Moreover, the controlled objects of the control apparatus of the motor sometimes show variations in their characteristics due to their secular changes. Even in this case, the adoption of the method of adjusting the control parameters used in the control apparatus of the motor according to the embodiment of the invention, allows the control apparatus to stably drive the motor having the characteristics that have undergone the secular change.

Likewise, the control apparatus of the motor, which adopts the method of adjusting the control parameters according to the embodiment of the invention, is capable of performing the fully-closed control. As described above, the control apparatus of the motor, which adopts the method of adjusting the control parameters according to the embodiment of the invention, is capable of stably driving the motor even with the characteristics that have undergone the secular change.

Hereinafter, the embodiments of the present invention will be described with reference to the accompanying drawings. It is noted, however, that each of the following embodiments is nothing more than an example for embodying the present invention, and is in no way intended to limit the technical scope of the invention.

Note that, the expression "a feedback circuit is stable" as referred to in the following descriptions means the state where, in a closed control loop, a feedback value for a command value converges into a command value.

In contrast, the expression "a feedback circuit is not stable," that is, "the feedback circuit is in an unstable state" as referred to hereinafter means the state where, in a closed control loop, a feedback value for a command value oscillates while the amplitude of the oscillation continues to increase.

Generally, whether the feedback circuit is in a stable state or an unstable state can be determined by detecting frequency characteristics of the feedback circuit.

First Exemplary Embodiment

Figure 2:
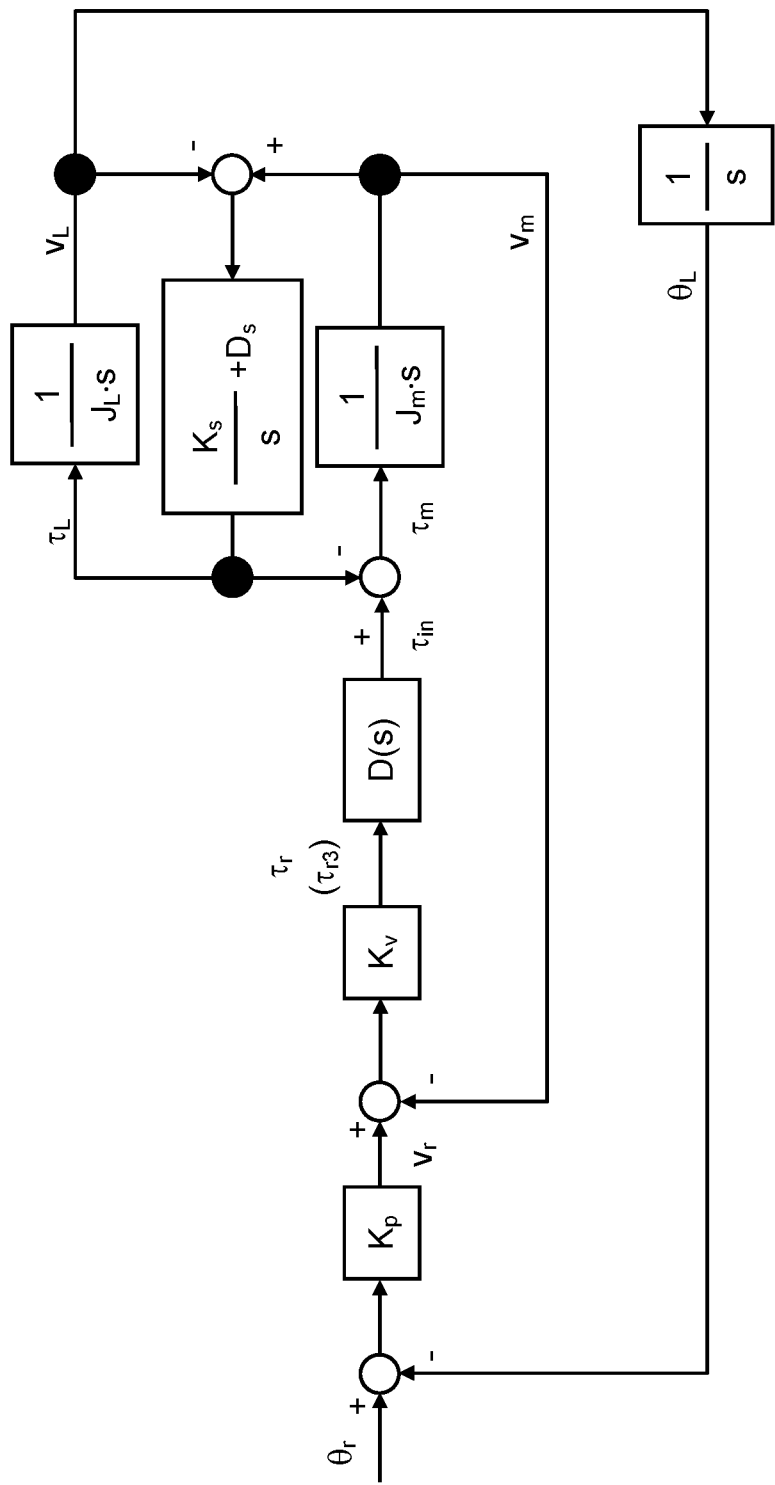
FIG. 2 is a block diagram of the control apparatus of the motor according to the first embodiment of the invention.
Figure 3:
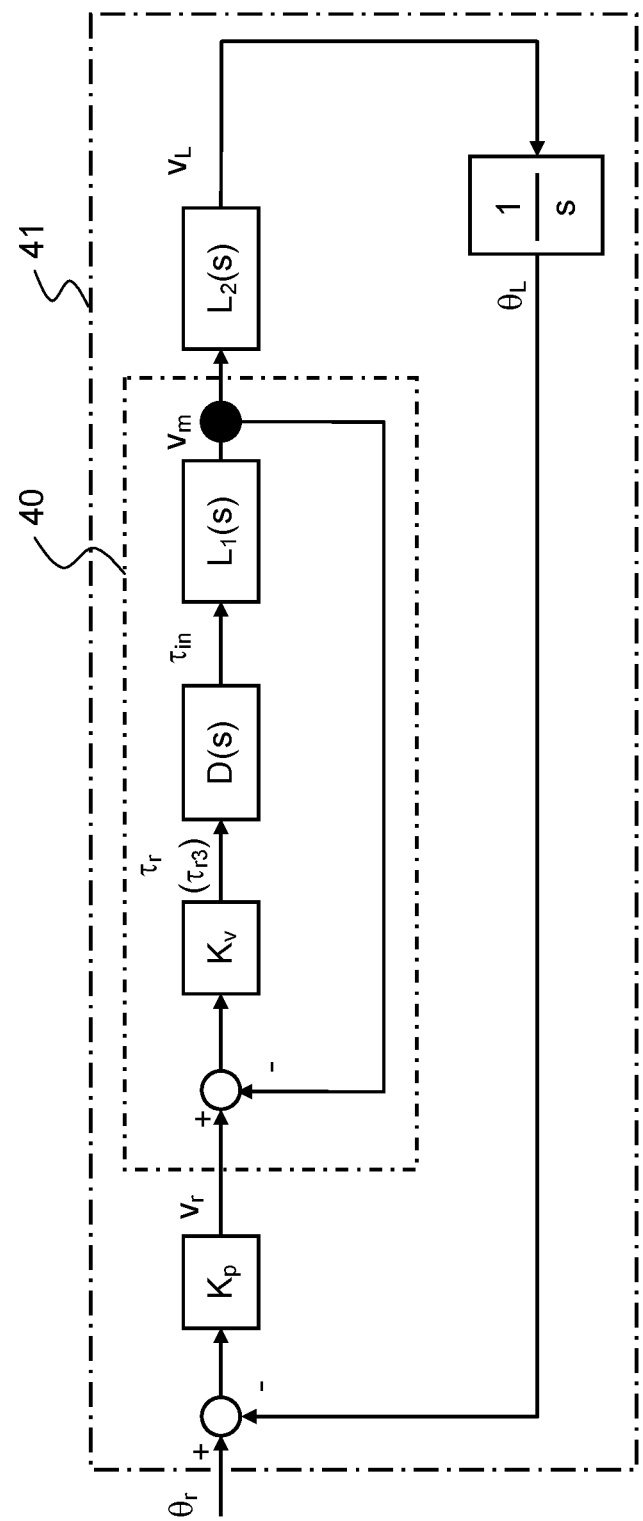
FIG. 3 is another block diagram of the control apparatus of the motor according to the first embodiment of the invention.
Figure 4:
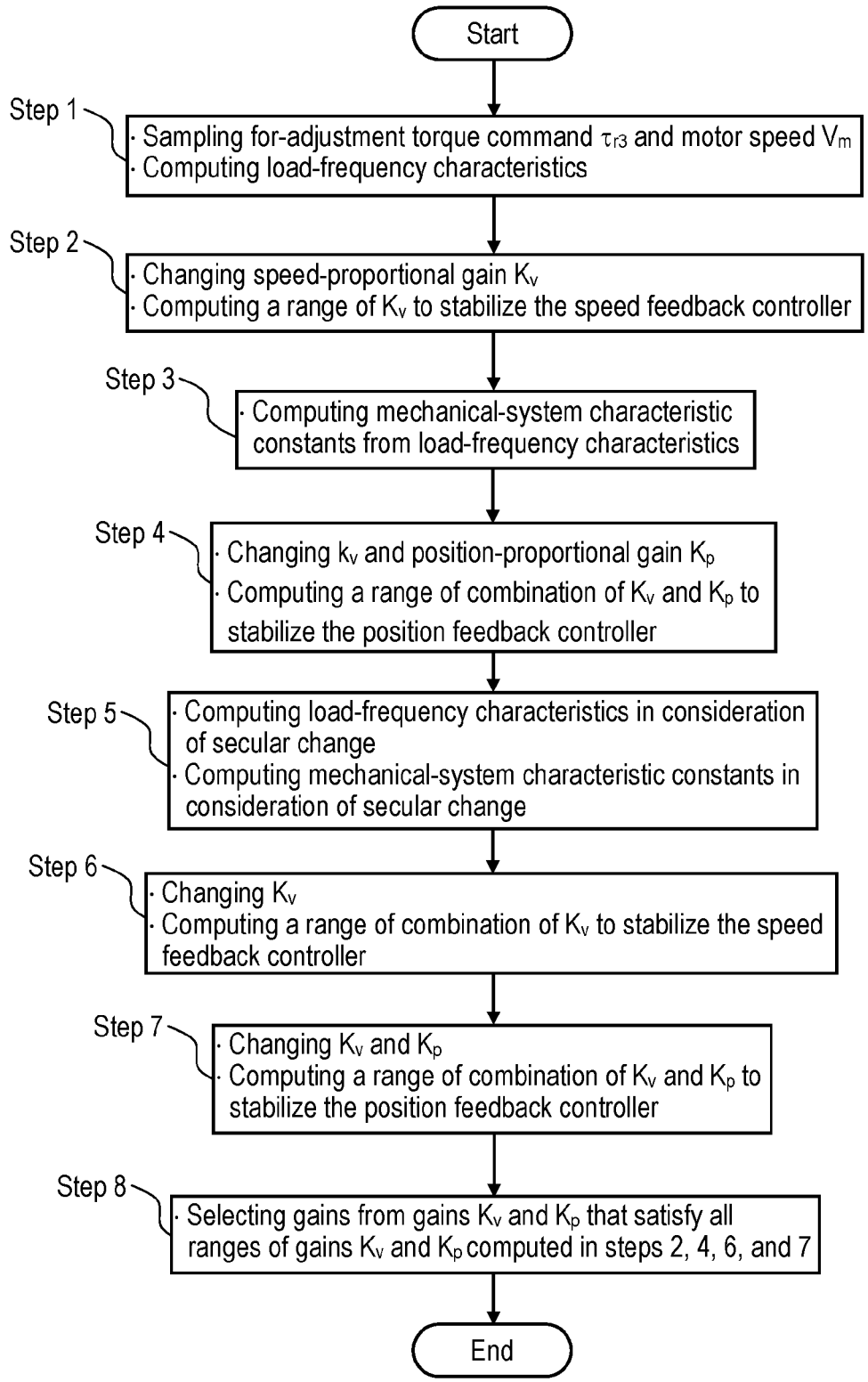
FIG. 4 is a flowchart illustrating control in the control apparatus of the motor according to the first embodiment of the invention.

FIG. 1 is a view of a configuration of a control apparatus of an electric motor according to a first embodiment of the present invention. FIG. 2 is a block diagram of the control apparatus of the motor according to the first embodiment of the invention. FIG. 3 is another block diagram of the control apparatus of the motor according to the first embodiment of the invention. FIG. 4 is a flowchart illustrating control in the control apparatus of the motor according to the first embodiment of the invention.

In the following descriptions, the control apparatus of the motor according to the first embodiment of the invention will be exemplified to explain a method of adjusting control parameters used in the control apparatus of the motor.

As shown in FIG. 1, control apparatus 30 of the motor according to the first embodiment of the invention includes: position controller 6 serving as a first position controller; speed controller 7; torque controller 9; and torque command generator 10.

Position controller 6 generates speed command $v_r$ such that position command $\theta_r$, which is transmitted from the outside of control apparatus 30 of the motor, coincides with load position $\theta_L$ which is a detected position of load 2 coupled with motor 1.

Speed controller 7 generates torque command $\tau_r$ such that speed command $v_r$ coincides with motor speed $v_m$ which is a detected speed of the motor.

Torque controller 9 drives motor 1 in accordance with torque command $\tau_r$.

Torque command generator 10 outputs for-adjustment torque command $\tau_{r3}$ containing a plurality of frequency components.

In control apparatus 30 of the motor according to the first embodiment of the present invention, there are formed both speed feedback circuit 40 and position feedback circuit 41 serving as a first position feedback circuit.

Speed feedback circuit 40 includes speed controller 7 and torque controller 9. Speed feedback circuit 40 is a control loop in which motor speed $v_m$ to be re-inputted to speed controller 7 is obtained from both speed command $v_r$ and motor speed $v_m$, i.e. a detected speed of the motor, with both having been inputted to speed controller 7.

Position feedback circuit 41 includes position controller 6 and speed feedback circuit 40. Position feedback circuit 41 is a control loop in which load position $\theta_L$, which is a detected position of the load coupled with the motor and is to be re-input to position controller 6, is obtained from both position command $\theta_r$ and load position $\theta_L$, i.e. a detected position of load 2 coupled with motor 1, with both having been inputted to position controller 6.

As shown in FIG. 4, the method, which is used in control apparatus 30 of the motor described above, of adjusting the control parameters according to the embodiment of the invention includes the steps of: computing first frequency characteristics (Step 1); computing a present speed-proportional gain range (Step 2); computing present mechanical-system characteristic constants (Step 3); computing a present proportional gain range (Step 4); computing secular characteristics (Step 5); computing a secular speed-proportional gain range (Step 6); computing a secular proportional gain range (Step 7); and selecting proportional gains (Step 8).

As shown in FIGS. 1, 3, and 4, the step (Step 1) of computing the first frequency characteristics uses motor speed $v_m$ and for-adjustment torque command $\tau_{r3}$ which is output from torque command generator 10. The motor speed $v_m$ is a motor's detection speed which is a detected speed of the motor detected when motor 1 is driven in accordance with for-adjustment torque command $\tau_{r3}$. In the step (Step 1) of computing the first frequency characteristics, present load-frequency characteristics are computed which are frequency characteristics from for-adjustment torque command $\tau_{r3}$ to motor speed $v_m$, i.e. a detected speed of the motor.

The step (Step 2) of computing the present speed-proportional gain range uses the present load-frequency characteristics and speed-proportional gain $K_v$ which is a control parameter used in speed controller 7. In the step (Step 2) of computing the present speed-proportional gain range, the present speed-proportional gain range is computed such that speed feedback circuit 40 becomes stable.

Note that, in the first embodiment, the expression "speed feedback circuit 40 is stable" as referred to herein means the state where motor speed $v_m$, which is a feedback value for speed command $v_r$ serving as a command value, follows the speed command to converge into the command value.

The step (Step 3) of computing the present mechanical-system characteristic constants uses the present load-frequency characteristics. In the step (Step 3) of computing the present mechanical-system characteristic constants, the present mechanical-system characteristic constants are computed which show characteristics of mechanical system 20 that includes motor 1 and load 2.

The step (Step 4) of computing the present proportional gain range uses speed-proportional gain $K_v$, position-proportional gain $K_p$ serving as a control parameter used in position controller 6, the present load-frequency characteristics, and the present mechanical-system characteristic constants. In the step (Step 4) of computing the present proportional gain range, a range of combination of the present speed-proportional gain and the present position-proportional gain is computed such that position feedback circuit 41 becomes stable.

Note that, in the first embodiment, the expression "position feedback circuit 41 is stable" as referred to herein means the state where load position $\theta_L$, which is a feedback value for position command $\theta_r$ serving as a command value, follows the speed command to converge into the command value.

In the step (Step 5) of computing the secular characteristics, both secular load-frequency characteristics and secular mechanical-system characteristic constants are computed, on the basis of the present load-frequency characteristics and secular-change information which is transmitted from the outside of control apparatus 30 of the motor. The secular load-frequency characteristics are load-frequency characteristics which have undergone a secular change. The secular mechanical-system characteristic constants are mechanical-system characteristic constants which have undergone the secular change.

The step (Step 6) of computing the secular speed-proportional gain range uses speed-proportional gain $K_v$ and the secular load-frequency characteristics. In the step (Step 6) of computing the secular speed-proportional gain range, the secular speed-proportional gain range is computed such that speed feedback circuit 40 becomes stable.

The step (Step 7) of computing the secular proportional gain range uses speed-proportional gain $K_v$, position-proportional gain $K_p$, the secular load-frequency characteristics, and the secular mechanical-system characteristic constants. In the step (Step 7) of computing the secular proportional gain range, a range of combination of the secular speed-proportional gain and the secular position-proportional gain is computed such that position feedback circuit 41 becomes stable.

In the step (Step 8) of selecting the proportional gains, a value of the speed-proportional gain and a value of the position-proportional gain are selected from the following computed-ranges such that each value of the selected gains can satisfy all of the corresponding computed-ranges. Such computed-ranges includes: the present speed-proportional gain range; the range of combination of the present speed-proportional gain and the present position-proportional gain; the secular speed-proportional gain range; and the range of combination of the secular speed-proportional gain and the secular position-proportional gain.

The range of the present speed-proportional gain is computed by the step of computing the present speed-proportional gain range. The range of combination of the present speed-proportional gain and the present position-proportional gain is computed by the step of computing the present proportional gain range. The range of the secular speed-proportional gain is computed by the step of computing the secular speed-proportional gain range. The range of combination of the secular speed-proportional gain and the secular position-proportional gain is computed by the step of computing the secular proportional gain range.

The configuration which can provide particularly outstanding functional effects is as follows.

That is, in control apparatus 30 of the electric motor according to the first embodiment of the present invention, speed feedback circuit 40 further includes electric motor 1, motor position detector 3, and speed computing unit 5.

Motor position detector 3 detects motor position $\theta_m$, i.e. a detected position of motor 1, and then outputs the detected motor position $\theta_m$. Speed computing unit 5 computes motor speed $v_m$, i.e. a detected speed of the motor, on the basis of motor position $\theta_m$ that is output from motor position detector 3.

In addition, position feedback circuit 41 serving as the first position feedback circuit further includes load 2 and load position detector 4.

Load position detector 4 detects load position $\theta_L$, i.e. a detected position of load 2, and then outputs the detected load position $\theta_L$.

Moreover, in the step (Step 8) of selecting the proportional gains, the values of both the speed-proportional gain and the position-proportional gain may preferably be selected such that the largest speed-proportional gain can be obtained.

Detailed descriptions will be further made with reference to the Figures.

As shown in FIG. 1, the device in which the first embodiment of the present invention is adopted includes control apparatus 30 of the electric motor and mechanical system 20 driven by control apparatus 30 of the motor. Note that, in the following descriptions, control apparatus 30 of the electric motor is also referred to simply as control apparatus 30.

First, mechanical system 20 to be driven includes motor 1, load 2, motor position detector 3, and load position detector 4. Moreover, mechanical system 20 includes coupling units between these parts. The coupling units between these parts include: a coupling unit positioned between motor 1 and load 2, a coupling unit positioned between motor 1 and motor position detector 3, and a coupling unit positioned between load 2 and load position detector 4.

In mechanical system 20, motor 1 is coupled with load 2. Load 2 coupled with motor 1 is driven by motor 1. Motor position detector 3 is coupled with motor 1. Motor position detector 3 outputs motor position $\theta_m$ which is position information of motor 1. Load position detector 4 is coupled with load 2. Load position detector 4 outputs load position $\theta_L$ which is position information of load 2.

Here, load 2 is a device having a movable constituent element such as a table connected via a ball screw or a belt, for example. Motor position detector 3 is a sensor, such as an optical encoder or a resolver, to detect a rotation angle, for example. Load position detector 4 is a sensor, such as a linear scale, to measure an amount of linear motion, for example.

Control apparatus 30 outputs a signal to drive motor 1, as described later. In control apparatus 30, speed computing unit 5 is inputted with motor position $\theta_m$ which is output from motor position detector 3. In control apparatus 30, speed computing unit 5 computes motor speed $v_m$, i.e. a speed of motor 1, on the basis of inputted motor position $\theta_m$. Speed computing unit 5 outputs thus-computed motor speed $v_m$.

In the first embodiment, speed feedback circuit 40 to be described later is configured with speed controller 7, torque controller 9, motor 1, motor position detector 3, and speed computing unit 5. Likewise, position feedback circuit 41 is configured with position controller 6, speed feedback circuit 40, load 2, and load position detector 4.

Next, operations of control apparatus 30 according to the first embodiment will be described in which the control apparatus drives motor 1 to perform position control of load 2.

When the position control of load 2 is performed, switch 8 shown in FIG. 1 is switched to an a-side terminal.

Control apparatus 30 is inputted with position command $\theta_r$ from the outside of control apparatus 30. On the outside of control apparatus 30, a host controller and the like to generate position command $\theta_r$ is disposed.

Position controller 6 is inputted with a difference between position command $\theta_r$ and load position $\theta_L$ which is output from load position detector 4. Position controller 6 computes speed command $v_r$ such that position command $\theta_r$ coincides with load position $\theta_L$. Position controller 6 outputs thus-computed speed command $v_r$. For example, position controller 6 performs a proportional operation expressed by following Equation 1.

Note that, in Equation 1, Kp is the position-proportional gain.

Equation 1

$$v_r = K_p(\theta_r - \theta_L) \quad (1)$$

Speed controller 7 is inputted with a difference between speed command $v_r$ and motor speed $v_m$. Speed controller 7 computes torque command $\tau_r$ such that speed command $v_r$ coincides with motor speed $v_m$. Speed controller 7 outputs thus-computed torque command $\tau_r$. For example, Speed controller 7 performs a proportional operation expressed by following Equation 2.

Note that, in Equation 2, $K_v$ is the speed-proportional gain.

Equation 2

$$\tau_r = K_v(v_r - v_m) \quad (2)$$

Torque controller 9 converts inputted torque command $\tau_r$ into an electric current command. Torque controller 9 performs electric current control such that a current that flows in motor 1 coincides with the current command. Torque controller 9 performs the current control to drive motor 1.

In FIG. 2, $J_m$ is the inertia of motor 1. Likewise, $J_L$ is the inertia of load 2. Ks is the spring constant between motor 1 and load 2. $D_S$ is the viscosity coefficient between motor 1 and load 2. D(s) is the transfer function concerning a delay factor of the control system.

Moreover, "$\tau_m$" is the torque applied to motor 1. "$\tau_L$" is the torque applied to load 2. "$v_L$" is the load speed that is a speed of load 2. "$\tau_{in}$" is the electric power supplied from control apparatus 30, with the power expressing a torque generated by motor 1. "s" is the Laplace operator.

An equation of motion is derived on the basis of the block diagram shown in FIG. 2. By calculating the thus-derived equation of motion, the transfer function of motor speed $v_m$ can be calculated with respect to torque $\tau_{in}$ generated by motor 1. The transfer function of motor speed $v_m$ with respect to torque $\tau_{in}$ generated by motor 1 is expressed by following Equation 3.

Equation 3

$$\frac{v_m}{\tau_{in}} = \frac{J_L \cdot s^2 + D_s \cdot s + K_s}{J_m \cdot J_L \cdot s^3 + D_s(J_m + J_L) \cdot s^2 + K_s(J_m + J_L) \cdot s} \quad (3)$$

$$= \frac{\frac{J_L}{K_s}s^2 + \frac{D_s}{K_s}s + 1}{\frac{J_m J_L}{K_s}s^3 + \frac{D_s(J_m + J_L)}{K_s}s^2 + (J_m + J_L) \cdot s}$$

On the other hand, the coupling unit positioned between motor 1 and load 2 offers spring constant $K_S$ and viscosity coefficient $D_S$. Spring constant $K_S$ is a coefficient that indicates the degree of power of repulsion against torsion that occurs between motor 1 and load 2 which are coupled with each other via the coupling unit. Viscosity coefficient $D_S$ is a coefficient that indicates the degree of power of resistance in proportion to the speed of motor 1. For example, the power of resistance includes friction.

Therefore, mechanical system 20 can be considered to be a two-inertia system having resonance angular frequency $\omega_p$ and anti-resonance angular frequency $\omega_z$. In the two-inertia system, let $\zeta_p$ be the resonance damping coefficient and let $\zeta_z$ be the anti-resonance damping coefficient. In this case, the transfer function of motor speed $v_m$ with respect to torque $\tau_{in}$ generated by motor 1 is also expressed by following Equation 4.

Equation 4

$$\frac{v_m}{\tau_{in}} = \frac{1}{(J_m + J_L) \cdot s} \cdot \frac{\frac{1}{\omega_z^2}s^2 + 2\frac{\zeta_z}{\omega_z}s + 1}{\frac{1}{\omega_p^2}s^2 + 2\frac{\zeta_p}{\omega_p}s + 1} \quad (4)$$

$$= \frac{\frac{1}{\omega_z^2}s^2 + 2\frac{\zeta_z}{\omega_z}s + 1}{\frac{J_m + J_L}{\omega_p^2}s^3 + 2\frac{\zeta_p(J_m + J_L)}{\omega_p}s^2 + (J_m + J_L) \cdot s}$$

Moreover, an equation of motion is derived on the basis of the control block diagram shown in FIG. 2. By calculating the derived equation of motion, the transfer function of load speed $v_L$ with respect to torque $\tau_{in}$ generated by motor 1 can be computed. The transfer function of load speed $v_L$ with respect to torque $\tau_{in}$ generated by motor 1 is expressed by following Equation 5.

Equation 5

$$\frac{v_L}{\tau_{in}} = \frac{D_s \cdot s + K_s}{J_m J_L \cdot s^3 + D_s(J_m + J_L) \cdot s^2 + K_s(J_m + J_L) \cdot s} \quad (5)$$

$$= \frac{\frac{D_s}{K_s}s + 1}{\frac{J_m J_L}{K_s}s^3 + \frac{D_s(J_m + J_L)}{K_s}s^2 + (J_m + J_L) \cdot s}$$

Equation 3 and Equation 5 described above are used to derive the transfer function of load speed $v_L$ with respect to motor speed $v_m$. The thus-derived transfer function of load speed $v_L$ with respect to motor speed $v_m$ is expressed by following Equation 6.

Equation 6

$$\frac{v_L}{v_m} = \frac{\frac{D_s}{K_s}s + 1}{\frac{J_L}{K_s}s^2 + \frac{D_s}{K_s}s + 1} \quad (6)$$

$$= \frac{\frac{2\zeta_z}{\omega_z}s + 1}{\frac{1}{\omega_z^2}s^2 + \frac{2\zeta_z}{\omega_z}s + 1}$$

Equation 3 and Equation 6 described above can be used to convert the block diagram shown in FIG. 2 into the block diagram shown in FIG. 3.

In FIG. 3, $L_1(s)$ is the transfer function of motor speed $v_m$ with respect to torque $\tau_{in}$ generated by motor 1. $L_1(s)$ shown in FIG. 3 equals Equation 3 described above. Moreover, in FIG. 3, $L_2(s)$ is the transfer function of load speed $v_L$ with respect to motor speed $v_m$. $L_2(s)$ shown in FIG. 3 equals Equation 6 described above.

Position-proportional gain $K_p$ and speed-proportional gain $K_v$ are the control parameters used in control apparatus 30 shown in FIG. 1. Accordingly, adjustment of both position-proportional gain $K_p$ and speed-proportional gain $K_v$ can be performed through monitoring the stability of the frequency characteristics which are computed by using the transfer function derived from the block diagram shown in FIG. 3.

Next, descriptions will be made regarding the adjustment of both position-proportional gain $K_p$ and speed-proportional gain $K_v$, which both are the control parameters used in control apparatus 30, with reference to the flowchart shown in FIG. 4. Note that, all of the steps in the flowchart shown in FIG. 4 can be performed with control parameter adjuster 11.

When the control parameters are adjusted, switch 8 shown in FIG. 1 is switched to a b-side terminal. At this moment, for example, for-adjustment torque command $\tau_{r3}$ is output to torque controller 9 from torque command generator 10 for measuring the frequency characteristics. For-adjustment torque command $\tau_{r3}$ contains a plurality of frequency components such as an M-sequence signal. Motor 1 is driven in accordance with for-adjustment torque command $\tau_{r3}$.

At this moment, as shown in FIG. 4, both for-adjustment torque command $\tau_{r3}$ and motor speed $v_m$ are sampled by control parameter adjuster 11. Control parameter adjuster 11 computes the frequency characteristics from for-adjustment torque command $\tau_{r3}$ to motor speed $v_m$ (Step 1). Hereinafter, the thus-computed frequency characteristics are referred to as "load-frequency characteristics." The load-frequency characteristics indicate the present load-frequency characteristics.

The load-frequency characteristics can be computed by the following procedure. For example, each of sampled for-adjustment torque command $\tau_{r3}$ and sampled motor speed $v_m$ is subjected to Fourier transformation. The Fourier transformation of motor speed $v_m$ results in the computation of both gain characteristics and phase characteristics. Like this, the Fourier transformation of for-adjustment torque command $\tau_{r3}$ results in the computation of both gain characteristics and phase characteristics. The load-frequency characteristics are derived by subtracting the gain characteristics and phase characteristics which have been computed on the basis of for-adjustment torque command $\tau_{r3}$, from the gain characteristics and phase characteristics which have been computed on the basis of motor speed $v_m$. The thus-derived load-frequency characteristics are $D(s) \cdot L_1(s)$ shown in FIG. 3.

Next, speed-proportional gain $K_v$ is varied to compute a range of speed-proportional gain $K_v$ such that speed feedback circuit 40 shown in FIG. 3 becomes stable (Step 2). The thus-computed range of speed-proportional gain $K_v$ indicates the range of present speed-proportional gain $K_v$.

Speed-proportional gain $K_v$ is the control parameter of speed controller 7 shown in FIG. 1. In FIG. 3, speed feedback circuit 40 is surrounded by the dash-dot line.

For example, for speed feedback circuit 40 surrounded by the dash-dot line, the load-frequency characteristics of $D(s) \cdot L_1(s)$ are determined in Step 1. The thus-determined load-frequency characteristics are multiplied by speed-proportional gain $K_v$ to compute open-loop frequency characteristics in speed feedback circuit 40. A range, which allows speed feedback circuit 40 to be stable, of speed-proportional gain $K_v$ can be computed by such as a procedure of judging the stability of an open loop, with the procedure being described in Patent Literature 1.

Next, the load-frequency characteristics can be used to compute the mechanical-system characteristic constants which express the characteristics of the mechanical system (Step 3). The thus-computed mechanical-system characteristic constants indicate the present mechanical-system characteristic constants.

The mechanical-system characteristic constants include, for example, the resonance angular frequency, anti-resonance angular frequency, resonance damping coefficient, and anti-resonance damping coefficient. The mechanical-system characteristic constants can be computed by the following procedure, as one example: That is, the characteristics of known delay factor D(s) are subtracted from the load-frequency characteristics, thereby determining the characteristics of transfer function $L_1(s)$ of motor speed $v_m$ with respect to torque $\tau_{in}$ generated by motor 1. The mechanical-system characteristic constants can be computed by applying the least squares method or the like to the thus-determined characteristics of transfer function $L_1(s)$ of motor speed $v_m$.

Next, both speed-proportional gain $K_v$ and position-proportional gain $K_p$ are varied to compute a range of combination of speed-proportional gain $K_v$ and position-proportional gain $K_p$ such that position feedback circuit 41 becomes stable (Step 4). The thus-computed range of combination of speed-proportional gain $K_v$ and position-proportional gain $K_p$ indicates the range of combination of present speed-proportional gain $K_v$ and present position-proportional gain $K_p$.

Speed-proportional gain $K_v$ is the control parameter of speed controller 7. Position-proportional gain $K_p$ is the control parameter of position controller 6.

In FIG. 3, position feedback circuit 41 is the whole of the control block.

As described above, for example, once speed-proportional gain $K_v$ is given, the frequency characteristics of speed feedback circuit 40 can be computed by using the procedure described in Step 2.

Moreover, use of the mechanical-system characteristic constants determined in Step 3 allows the determination of transfer function $L_2(s)$ of load speed $v_L$ with respect to motor speed $v_m$. The mechanical-system characteristic constants include: resonance angular frequency $\omega_p$, anti-resonance angular frequency $\omega_z$, resonance damping coefficient $\zeta_p$, and anti-resonance damping coefficient $\zeta_z$.

Here, the open-loop frequency characteristics of position feedback circuit 41 can be computed by connecting position-proportional gain $K_p$, the frequency characteristics of speed feedback circuit 40, and transfer function $L_2(s)$. The range, which allows position feedback circuit 41 to be stable, of combination of speed-proportional gain $K_v$ and position-proportional gain $K_p$ can be computed by using a procedure of judging the stability of an open loop, with the procedure being one described above or the like.

Next, descriptions will be made regarding a step of computing a stable gain in cases where a secular change has occurred.

In cases where control apparatus 30 shown in FIG. 1 has undergone the secular change, the stiffness of elements included in the mechanical system often decreases and the amount of friction of the elements included in the mechanical system often changes. In cases of occurrence of such a secular change, it is considered that the transfer functions will change in the following values to be described later.

That is, resonance angular frequency $\omega_p$ and anti-resonance angular frequency $\omega_z$ will decrease. Resonance damping coefficient $\zeta_p$ and anti-resonance damping coefficient $\zeta_z$ will change as follows.

That is, as the friction increases, both resonance damping coefficient $\zeta_p$ and anti-resonance damping coefficient $\zeta_z$ increase. In contrast, as the friction decreases, both resonance damping coefficient $\zeta_p$ and anti-resonance damping coefficient $\zeta_z$ decrease.

Consequently, concerning the elements included in the mechanical system, effects of such a secular change are examined, in advance, on the degree of how much a change will occur in each of resonance angular frequency $\omega_p$, anti-resonance angular frequency $\omega_z$, resonance damping coefficient $\zeta_p$, and anti-resonance damping coefficient $\zeta_z$. This examination allows the determination of the load-frequency characteristics after the secular change has occurred, and allows the determination of transfer function $L_2(s)$ of load speed $v_L$ with respect to motor speed $v_m$ after the secular change has occurred.

The load-frequency characteristics and transfer function $L_2(s)$ of load speed $v_L$ with respect to motor speed $v_m$, both after the secular change has occurred, can be computed by substituting, for Equations 4 and 6, pre-examined resonance angular frequency $\omega_p$, pre-examined anti-resonance angular frequency $\omega_z$, pre-examined resonance damping coefficient $\zeta_p$, and pre-examined anti-resonance damping coefficient $\zeta_z$.

As described above, in cases of the secular change having occurred, the step of computing the stable gain range is started by determining the load-frequency characteristics after the secular change has occurred, and by determining transfer function $L_2(s)$ of load speed $v_L$ with respect to motor speed $v_m$ after the secular change has occurred (Step 5). The load-frequency characteristics after the secular change has occurred indicate the secular load-frequency characteristics.

Pre-examined information is used to determine the load-frequency characteristics after the secular change has occurred and to determine transfer function $L_2(s)$ of load speed $v_L$ with respect to motor speed $v_m$ after the secular change has occurred. Such pre-examined information includes the degree of how much a change will occur in each of resonance angular frequency $\omega_p$, anti-resonance angular frequency $\omega_z$, resonance damping coefficient $\zeta_p$, and anti-resonance damping coefficient $\zeta_z$.

Next, in a similar way to Steps 2 and 4, both the range of speed-proportional gain $K_v$ and the range of combination of speed-proportional gain $K_v$ and position-proportional gain $K_p$ are computed by using the load-frequency characteristics and transfer function $L_2(s)$ which both are computed in Step 5. Speed-proportional gain $K_v$ is the control parameter of speed controller 7, and allows the speed controller to be stable. Position-proportional gain $K_p$ is the control parameter of position controller 6 (Step 6, Step 7). The thus-computed range of speed-proportional gain $K_v$ indicates the range of secular speed-proportional gain $K_v$; the thus-computed range of combination of speed-proportional gain $K_v$ and position-proportional gain $K_p$ is the range of combination of secular speed-proportional gain $K_v$ and secular position-proportional gain $K_p$.

Finally, values of the speed-proportional gain and the position-proportional gain are selected from the range of speed-proportional gain $K_v$ and the range of position-proportional gain $K_p$, provided that each of the selected values can satisfy all of the respective ranges consisting of: the ranges of speed-proportional gain $K_v$; and the ranges of combination of speed-proportional gain $K_v$ and position-proportional gain $K_p$, with the respective ranges having been computed in Steps 2, 4, 6, and 7 (Step 8).

For example, one way of the selection may be such that the values of the gains are selected to maximize speed-proportional gain $K_v$. Therefore, in the control apparatus of the motor in which the fully-closed control is performed, it is possible to adjust the control parameters which can provide stable drive even in cases where the secular change has occurred.

Second Exemplary Embodiment

Descriptions of another embodiment of the present invention will be made.

Note that, in the descriptions hereinafter of a second embodiment, parts having the same configurations as those shown in the first embodiment described above are designated by the same numerals and symbols, and the contents of their descriptions are incorporated herein by reference.

Figure 5:
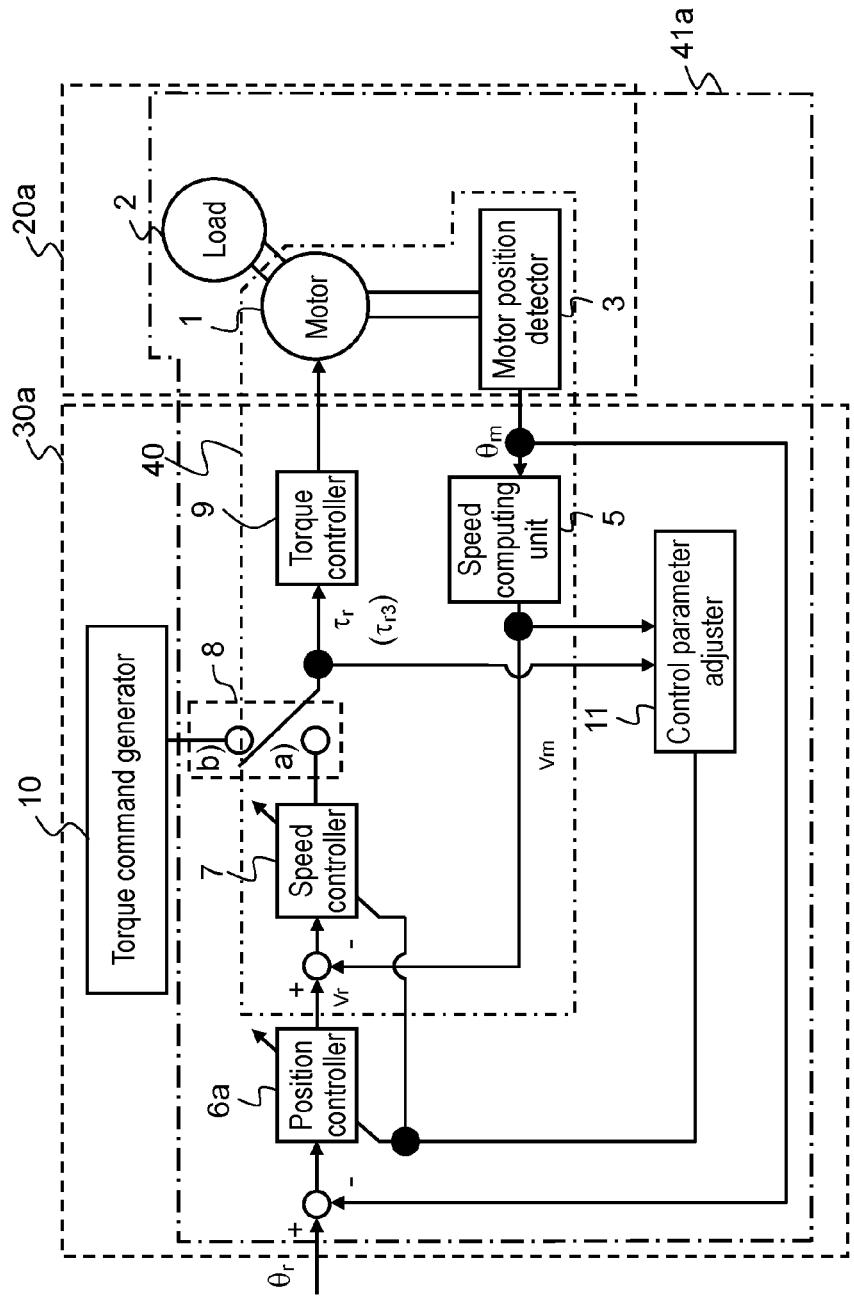
FIG. 5 is a view of a configuration of a control apparatus of a motor according to a second embodiment of the present invention.
Figure 6:
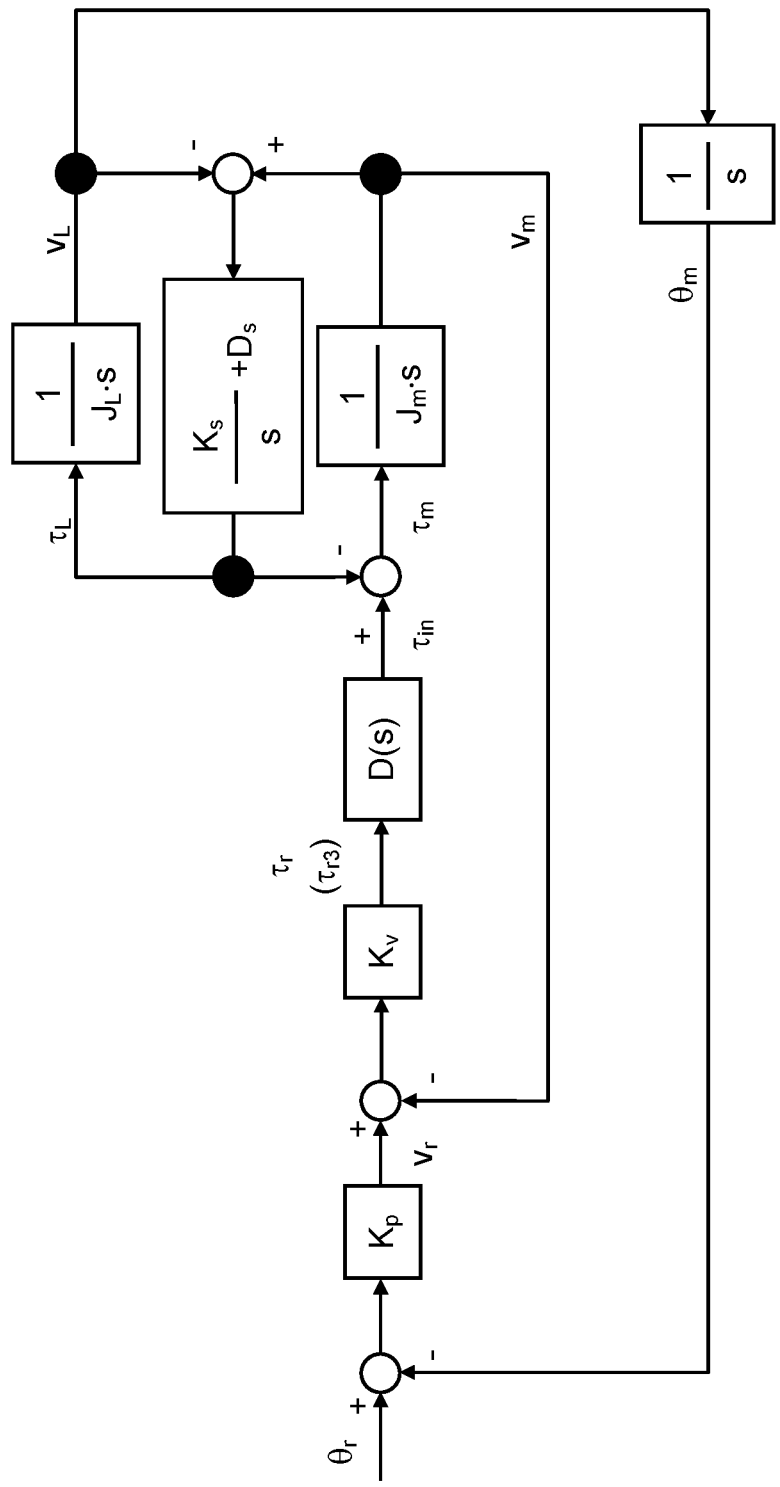
FIG. 6 is a block diagram of the control apparatus of the motor according to the second embodiment of the invention.
Figure 7:
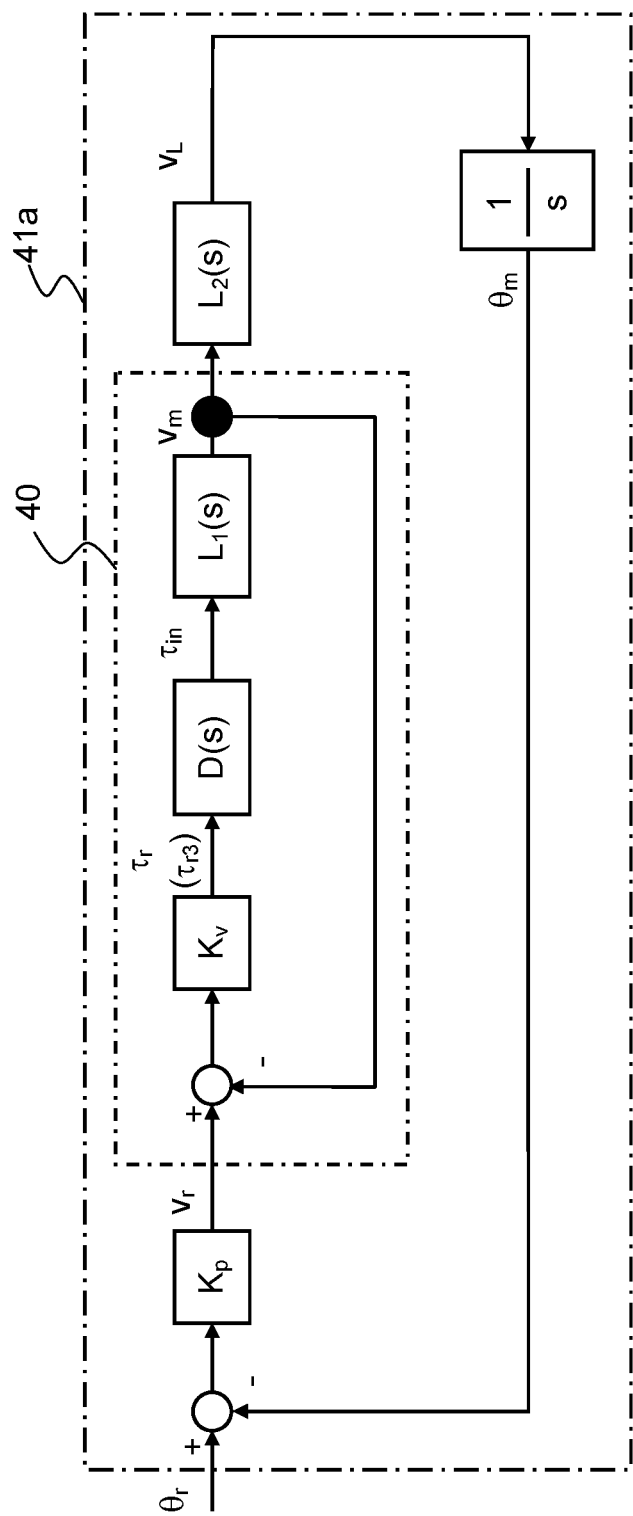
FIG. 7 is another block diagram of the control apparatus of the motor according to the second embodiment of the invention.

FIG. 5 is a view of a configuration of a control apparatus of an electric motor according to the second embodiment of the present invention. FIG. 6 is a block diagram of the control apparatus of the motor according to the second embodiment of the invention. FIG. 7 is another block diagram of the control apparatus of the motor according to the second embodiment of the invention.

Differences in configuration are as follows, between control apparatus 30a of the motor according to the second embodiment and control apparatus 30 of the motor according to the first embodiment described above.

That is, as shown in FIG. 5, control apparatus 30a of the motor according to the second embodiment of the present invention includes: position controller 6a serving as a second position controller, speed controller 7, torque controller 9, and torque command generator 10.

Position controller 6a generates speed command $v_r$ such that position command $\theta_r$, which is transmitted from the outside of control apparatus 30 of the motor, coincides with load position $\theta_m$ that is a detected position of motor 1.

Speed controller 7 generates torque command $\tau_r$ such that speed command $v_r$ coincides with motor speed $v_m$ that is a detected speed of the motor.

Torque controller 9 drives motor 1 in accordance with torque command $\tau_r$.

Torque command generator 10 outputs for-adjustment torque command $\tau_{r3}$ which contains a plurality of frequency components.

In control apparatus 30a of the motor according to the second embodiment of the invention, there are formed speed feedback circuit 40 and position feedback circuit 41a serving as a second position feedback circuit.

Speed feedback circuit 40 includes speed controller 7 and torque controller 9. Speed feedback circuit 40 is a control loop in which motor speed $v_m$ to be re-inputted to speed controller 7 is obtained from both speed command $v_r$ and motor speed $v_m$, i.e. a detected speed of the motor, with both having been inputted to speed controller 7.

In the second embodiment, speed feedback circuit 40 includes: speed controller 7, torque controller 9, motor 1, motor position detector 3, and speed computing unit 5.

Position feedback circuit 41a includes position controller 6a and speed feedback circuit 40. Position feedback circuit 41a is a control loop in which load position $\theta_L$, which is a detected position of the motor and is to be re-input to position controller 6a, is obtained from both position command $\theta_r$ and load position $\theta_L$, i.e. a detected position of motor 1, with both having been inputted to position controller 6.

In the second embodiment, position feedback circuit 41a includes position controller 6a and speed feedback circuit 40.

Moreover, in the second embodiment, the expression "position feedback circuit 41a is stable" as referred to herein means the state where motor position $\theta_m$, which is a feedback value for position command $\theta_r$ serving as a command value, follows the position command to converge into the command value.

That is, in the first embodiment described above, the descriptions were made regarding the method of adjusting the control parameters of the control apparatus of the motor in which the fully-closed control is performed. According to the method of adjusting the control parameters, the motor can be stably driven even if the secular change has occurred.

On the other hand, in the second embodiment, the method of adjusting the control parameters used in the control apparatus of the motor can also be applied to the control apparatus of a motor in which semi-closed control is performed.

Detailed descriptions will be made further, with reference to the Figures.

As shown in FIG. 5, the apparatus according to the second embodiment includes control apparatus 30a of the motor and mechanical system 20a which is driven by control apparatus 30a of the motor. Note that, in the following descriptions, control apparatus 30a of the motor is also referred to simply as control apparatus 30a.

A major difference between the second embodiment and the first embodiment described above lies in their mechanical systems which are the controlled objects. Mechanical system 20a according to the second embodiment includes motor 1 in which the semi-closed control is performed.

As shown in FIGS. 5 to 7 and FIG. 4 incorporated herein by reference, control apparatus 30a of the second embodiment is capable of adjusting the control parameters by using motor position $\theta_m$ instead of load position $\theta_L$ that is used in the first embodiment.

Therefore, for the control apparatus of the motor in which the semi-closed control is performed, use of the method of adjusting the control parameters according to the second embodiment makes it possible to adjust the control parameters which permit stable drive of the motor even if the secular change has occurred.

Third Exemplary Embodiment

Further another embodiment of the present invention will be described.

Note that, in the descriptions hereinafter of a third embodiment, parts having the same configurations as those shown in the first and second embodiments described above are designated by the same numerals and symbols, and the contents of their descriptions are incorporated herein by reference.

Figure 8:
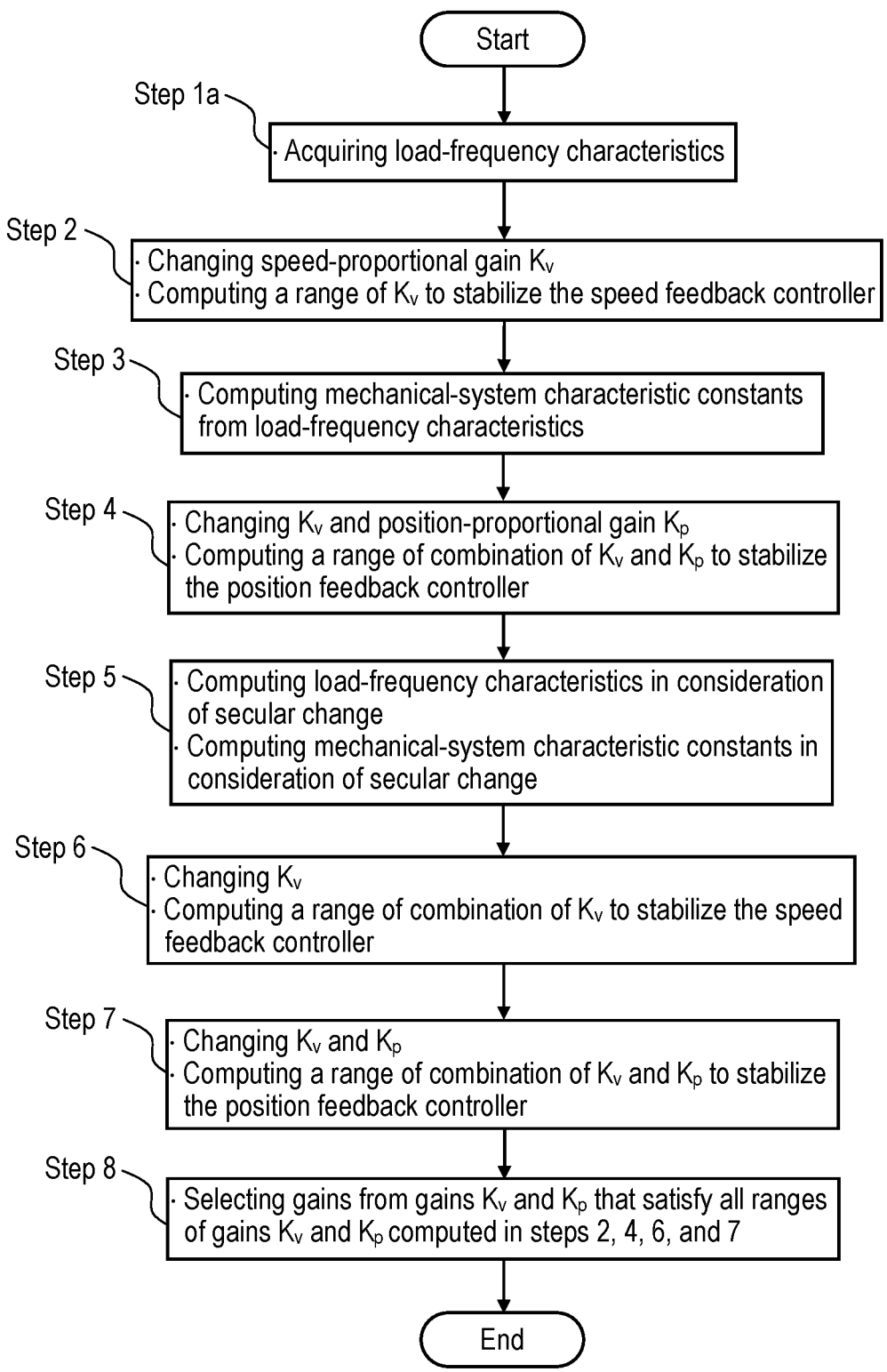
FIG. 8 is a flowchart illustrating control in a control apparatus of a motor according to a third embodiment of the present invention.
Figure 9:
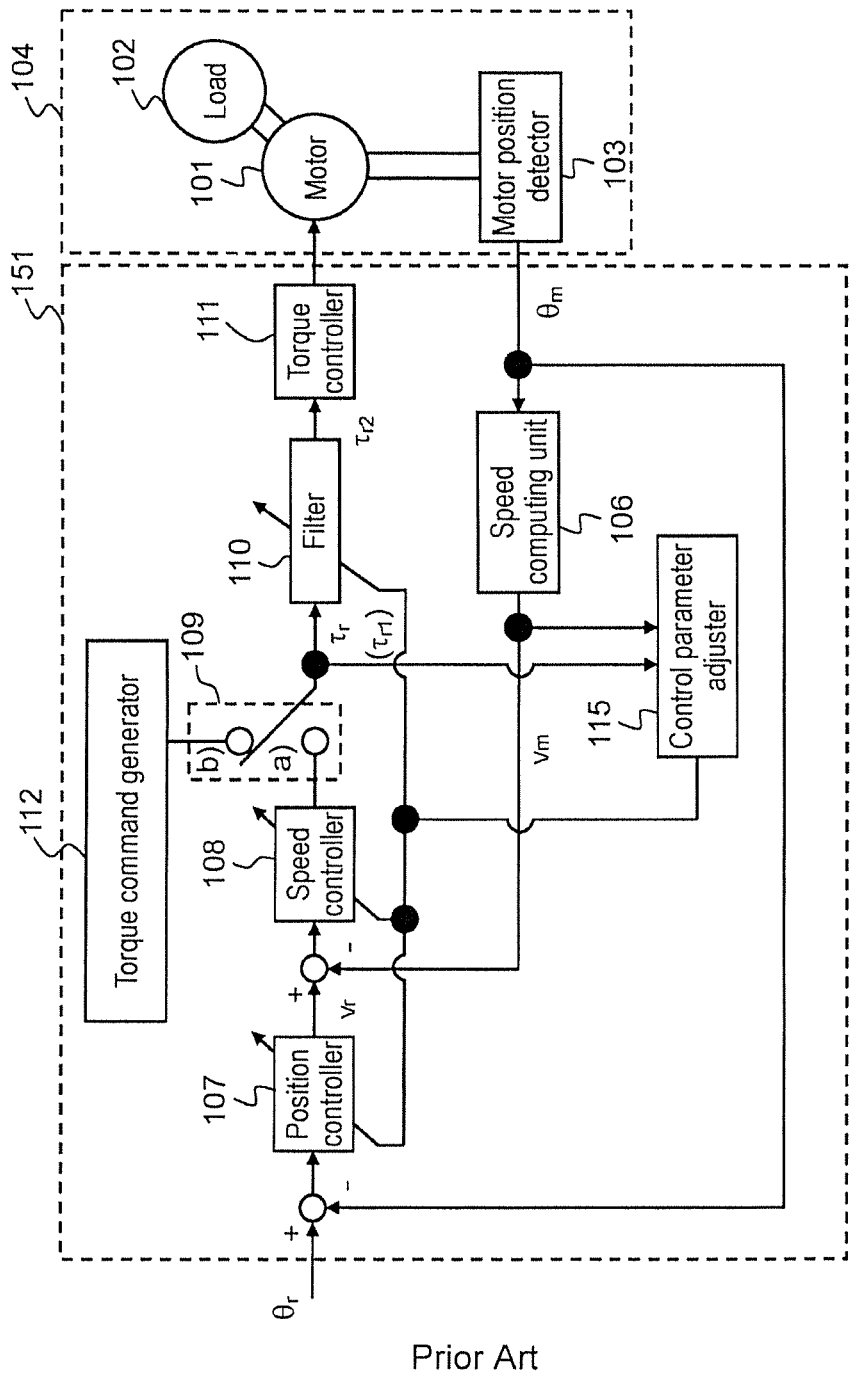
FIG. 9 is a view of a configuration of a control apparatus of a conventional motor.

FIG. 8 is a flowchart illustrating control in a control apparatus of an electric motor according to the third embodiment of the present invention.

There exist differences in procedure between a method of adjusting control parameters used in the control apparatus of the motor according to the third embodiment and the methods of adjusting the control parameters used in the control apparatuses of the motors according to the first and second embodiments described above. Such differences are as follows:

That is, as shown in FIG. 8, the method of adjusting the control parameters used in the control apparatus of the motor according to the third embodiment of the present invention is as follows: In a step (Step 1a) of computing second frequency characteristics, present load-frequency characteristics are acquired which are frequency characteristics from for-adjustment torque command $\tau_{r3}$ to a detected speed of the motor.

With the flowchart according to the first embodiment described above, it has been described that the following process is performed in Step 1.

That is, first, both for-adjustment torque command $\tau_{r3}$ and motor speed $v_m$ are sampled by control parameter adjuster 11. In control parameter adjuster 11, thus-sampled for-adjustment torque command $\tau_{r3}$ and thus-sampled motor speed $v_m$ are subjected to Fourier transformation to compute load-frequency characteristics.

In accordance with the method, to be described later, of adjusting the control parameters according to the third embodiment, the following procedure is possible in place of Step 1.

That is, as shown in FIG. 8, control parameter adjuster 11 is inputted with data after the Fourier transformation, thereby acquiring the load-frequency characteristics. The acquired load-frequency characteristics are used to perform computations in Step 2 and subsequent ones.

Alternatively, load-frequency characteristics which have been computed in advance (Step 1a) are used to perform the computations in Step 2 and subsequent ones.

The method of adjusting the control parameters according to the third embodiment can be used in both control apparatuses, that is, the control apparatus of the motor performing the fully-closed control described in the first embodiment and the control apparatus of the motor performing the semi-closed control described in the second embodiment.

Moreover, the way of selection in Step 8 may be such that the gain values are selected to maximize speed-proportional gain $K_v$. Therefore, in both of the control apparatus of the motor performing the fully-closed control and the control apparatus of the motor performing the semi-closed control, the adjustment of their control parameters can be made to provide stable drive even in cases where the secular change has occurred.

Note that, in Step 8 according to each of the embodiments described above, it has been described that the gain values may be selected to maximize speed-proportional gain $K_v$. However, speed-proportional gain $K_v$ is not limited to the maximized value as long as a stable gain value can be selected. Instead, the speed-proportional gain may be another value selected by a user.

Moreover, in the descriptions of the first embodiment, the embodiment has been exemplified by the case where the mechanical system is a two-inertia system. The present invention can be applied to the cases where the mechanical system is a multi-inertia system such as a three-inertia system. The present invention is capable of providing the same advantageous effects even in the cases where the mechanical system is a multi-inertia system such as a three-inertia system.

In addition, in Steps 2, 4, 6, and 7 in the first embodiment, it has been described that the gain, which allows the speed feedback circuit to be stable, is computed by a procedure of, such as, judging the stability of an open loop, with the procedure being described in Patent Literature 1.

Note that the procedure of judging the stability of an open loop is used in the descriptions, which is one described in Patent Literature 1; however, other procedures may also be used including the following one, for example. That is, the procedure includes: calculating the frequency characteristics of a closed loop which the feedback circuit has, determining a gain peak of the calculated frequency characteristics of the closed loop, and then judging that the loop is stable when the gain peak is not larger than a predetermined value.

As can be seen clearly from the aforementioned descriptions, in accordance with the embodiments of the present invention, both the speed-proportional gain and the position-proportional gain are obtained from the two states of operation, in order to extract the control parameters used in the control apparatus of the electric motor. One is a state of operation of the present mechanical system, and the other is an expected state of operation of the mechanical system after the apparatus has undergone the secular change.

The method of extracting the control parameters according to the embodiment can be used in both types of control apparatuses, that is, the control apparatus of the motor performing the fully-closed control and the control apparatus of the motor performing the semi-closed control.

INDUSTRIAL APPLICABILITY

The method of adjusting the control parameters used in the control apparatuses of the electric motors according to the present invention is useful for both types of control apparatuses of the motors performing the fully-closed control and control apparatuses of the motors performing the semi-closed control, when adjusting the control parameters of the control apparatuses that have undergone the secular change.

REFERENCE MARKS IN THE DRAWINGS

1, 101 motor
2, 102 load
3, 103 motor position detector
4 load position detector
5, 106 speed computing unit
6, 6a, 107 position controller (first position controller, second position controller)
7, 108 speed controller
8, 109 switch
9, 111 torque controller
10, 112 torque command generator
11, 115 control parameter adjuster
20, 20a, 104 mechanical system
30, 30a, 151 control apparatus (control apparatus of motor)
40 speed feedback circuit
41, 41a position feedback circuit (first position feedback circuit, second position feedback circuit)
110 filter

The invention claimed is:

1. A control apparatus of an electric motor, the control apparatus including:
   a first position controller for generating a speed command such that a position command transmitted from an outside of the control apparatus of the motor coincides with a load's detection position that is a detected position of a load coupled with the motor;
   a speed controller for generating a torque command such that the speed command coincides with a motor's detection speed that is a detected speed of the motor;

a torque controller for driving the motor in accordance with the torque command; and a torque command generator for outputting a for-adjustment torque command containing a plurality of frequency components, wherein a speed feedback circuit serving as a control loop is formed including the speed controller and the torque controller, the speed feedback circuit acquiring a motor's detection speed to be re-inputted to the speed controller, the motor's detection speed to-be-re-inputted being acquired from the speed command and the motor's detection speed, the speed command and the motor's detection speed having been inputted to the speed controller, wherein a first position feedback circuit serving as a control loop is formed including the first position controller and the speed feedback circuit, the first position feedback circuit acquiring a load's detection position to be re-inputted to the first position controller, the load's detection position to-be-re-inputted being acquired from the position command and the load's detection position, the position command and the load's detection position having been inputted to the first position controller, where the load's detection position is a detected position of a load coupled with the motor, and wherein the control apparatus is configured to:
compute a present load-frequency characteristic by using the for-adjustment torque command output from the torque command generator of the control apparatus and by using the motor's detection speed detected when the electric motor is driven in accordance with the for-adjustment torque command, the present load-frequency characteristic being a frequency characteristic from the for-adjustment torque command to the motor's detection speed;

compute a present speed-proportional gain range by using a speed-proportional gain and the present load-frequency characteristic such that the speed feedback circuit of the control apparatus becomes stable, the present speed-proportional gain range being a range of a present speed-proportional gain of the speed-proportional gain serving as the control parameter used in the speed controller of the control apparatus;

compute a present mechanical-system characteristic constant by using the present load-frequency characteristic, the present mechanical-system characteristic constant indicating a characteristic of a mechanical system containing the electric motor and a load coupled with the electric motor;

compute a present proportional gain range by using the speed-proportional gain, a position-proportional gain serving as the control parameter used in the first position controller, the present load-frequency characteristic, and the present mechanical-system characteristic constant such that a first position feedback circuit of the control apparatus becomes stable, the present proportional gain range being a range of a combination of the present speed-proportional gain and a present position-proportional gain of the position-proportional gain;

compute a secular characteristic based on the present load-frequency characteristic and secular-change information transmitted from an outside of the control apparatus of the electric motor, wherein the secular characteristic includes a secular load-frequency characteristic, and a secular mechanical-system characteristic constant, the secular load-frequency characteristic being the load-frequency characteristic having undergone a secular change and the secular mechanical-system characteristic constant being a mechanical-system characteristic constant having undergone the secular change;

compute a secular speed-proportional gain range by using the speed-proportional gain and the secular load-frequency characteristic such that the speed feedback circuit becomes stable;

compute a secular proportional gain range by using the speed-proportional gain, the position-proportional gain, the secular load-frequency characteristic, and the secular mechanical-system characteristic constant such that the first position feedback circuit becomes stable, wherein the secular proportional gain range is a range of a combination of a secular speed-proportional gain and a secular position-proportional gain, the secular speed-proportional gain being the speed-proportional gain having undergone the secular change and the secular position-proportional gain being the position-proportional gain having undergone the secular change;

select proportional gains from computed-ranges, the proportional gains including a value of the speed-proportional gain and a value of the position-proportional gain, the computed-ranges including:
the present speed-proportional gain range;
the range of the combination of the present speed-proportional gain and the present position-proportional gain;
the secular speed-proportional gain range; and
the range of the combination of the secular speed-proportional gain and the secular position-proportional gain, wherein each value of the selected proportional gains satisfies all of the corresponding computed-ranges; and control the load's detection position that is the detected position of the load coupled with the motor.

2. The control apparatus according to claim 1, wherein the speed feedback circuit further includes:
the motor;
a motor position detector for detecting a motor's detection position that is a detected position of the electric motor, and outputting the detected motor's detection position; and
a speed computing unit for computing the motor's detection speed based on the detected motor's detection position output from the motor position detector of the control apparatus,
wherein the first position feedback circuit further includes:
the load; and
a load position detector for detecting the load's detection position and outputting the detected load's detection position.

3. The control apparatus according to claim 1, wherein the control apparatus is further configured to select the value of the speed-proportional gain and the value of the position-proportional gain such that a largest speed-proportional gain is obtained, in the step of selecting the proportional gains.

* * * * *